United States Patent [19]

Matsuura et al.

[11] 4,175,318
[45] Nov. 27, 1979

[54] APPARATUS OF ASSEMBLING FUEL ROD BUNDLE

[75] Inventors: Mitsuaki Matsuura, Yokohama; Tsuyoshi Hidano; Masahiro Suzuki, both of Tokai, all of Japan

[73] Assignee: Doryokuro Kakunenryo Kaihatsu Kigyodan, Tokyo, Japan

[21] Appl. No.: 791,824

[22] Filed: Apr. 28, 1977

[30] Foreign Application Priority Data

May 22, 1976 [JP] Japan .................................. 51-58524

[51] Int. Cl.² ............................................. B23P 19/00
[52] U.S. Cl. .......................................... 29/723; 29/705; 29/720; 294/86 A
[58] Field of Search .................... 29/720, 705, 723; 294/86 A; 176/75, 76, 78; 214/1 P, 1.3, 1 CM

[56] References Cited

U.S. PATENT DOCUMENTS 3,855,684  12/1974  Kendall .............................. 29/723 X
3,937,332  2/1976  Flessner et al. ..................... 214/1 P Primary Examiner—Victor A. DiPalma
Attorney, Agent, or Firm—Lawrence I. Field

[57] ABSTRACT

An apparatus for assembling a fuel rod bundle having a number or elongated fuel rods arranged in parallel with each other and fixed by means of a plurality of spacers and lower and upper tie plates comprises a fuel rod supplying apparatus for feeding successive fuel rods in a longitudinal direction of the rods, said fuel rod supplying apparatus including means for carrying the rods in a direction perpendicular to the longitudinal direction to any one of a plurality of positions; a bundling apparatus including means for fixing or holding the spacers and the lower tie plate and means for rotating said fixing means by given angles; and a measuring apparatus including a circular pitch measuring mechanism and a layer space or pitch measuring mechanism for measuring circular and layer pitches of the assembled fuel rods in the bundling apparatus.

15 Claims, 42 Drawing Figures

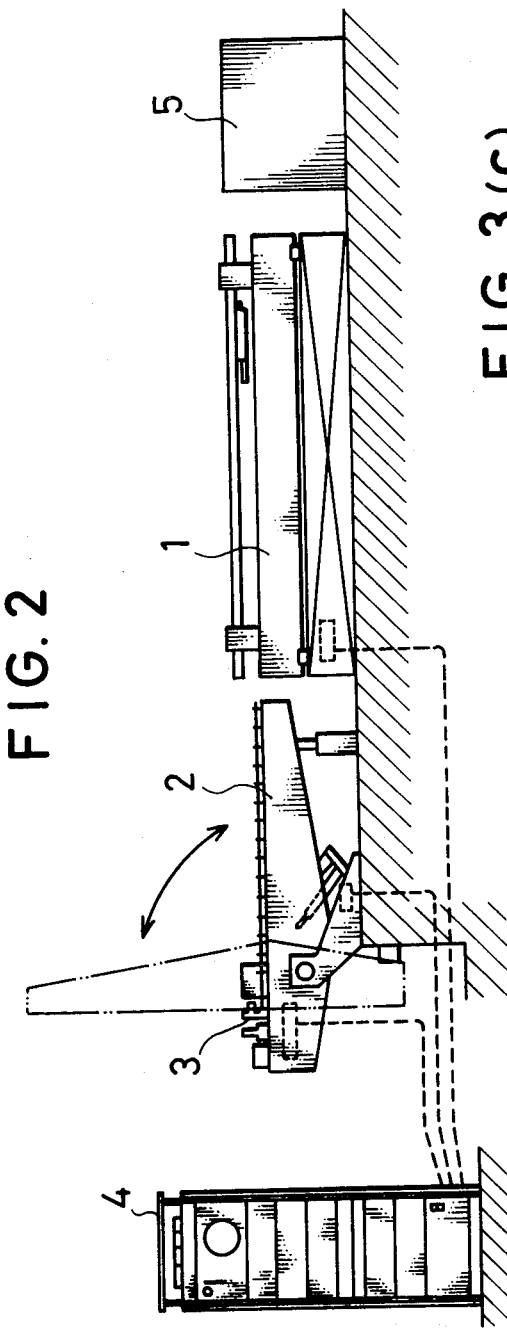
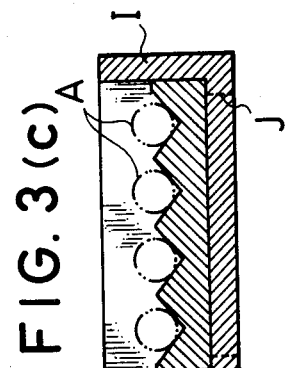
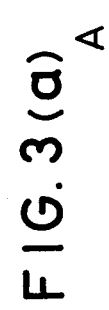
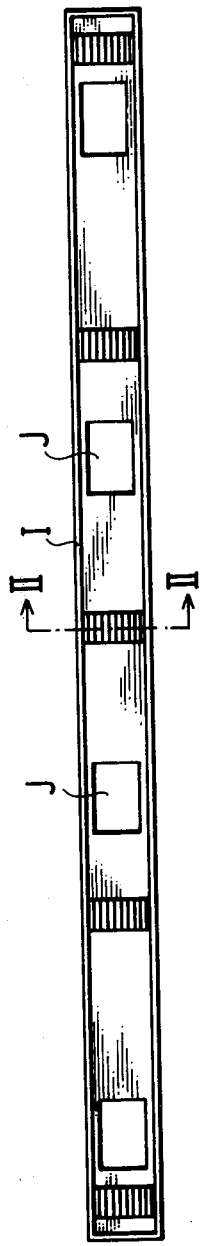
FIG. 2
FIG. 3(a)
FIG. 3(b)
FIG. 3(c)

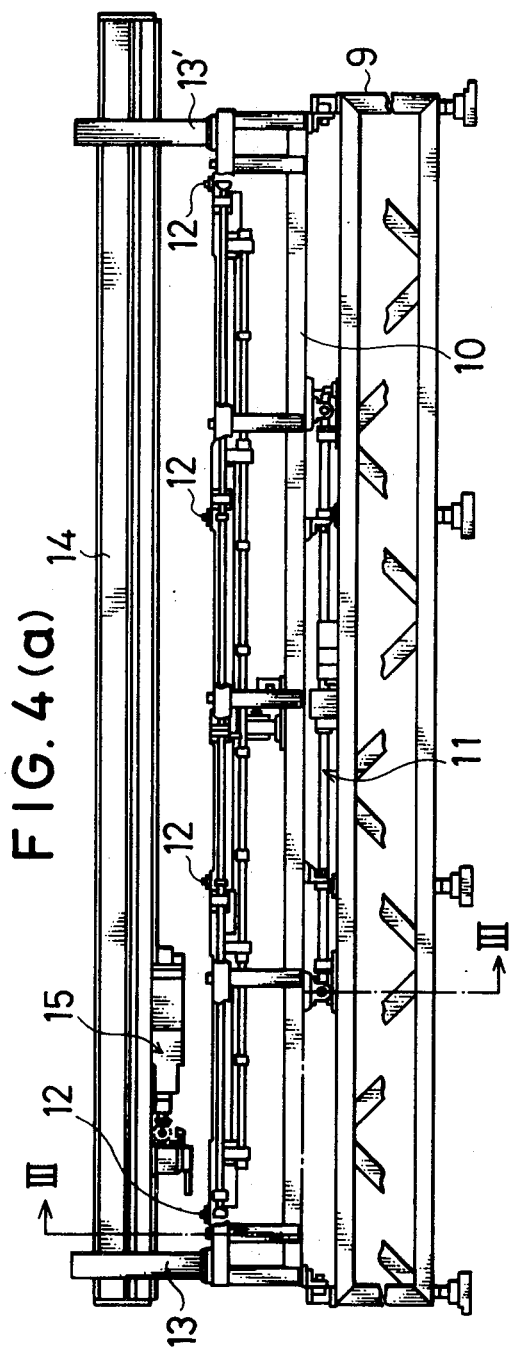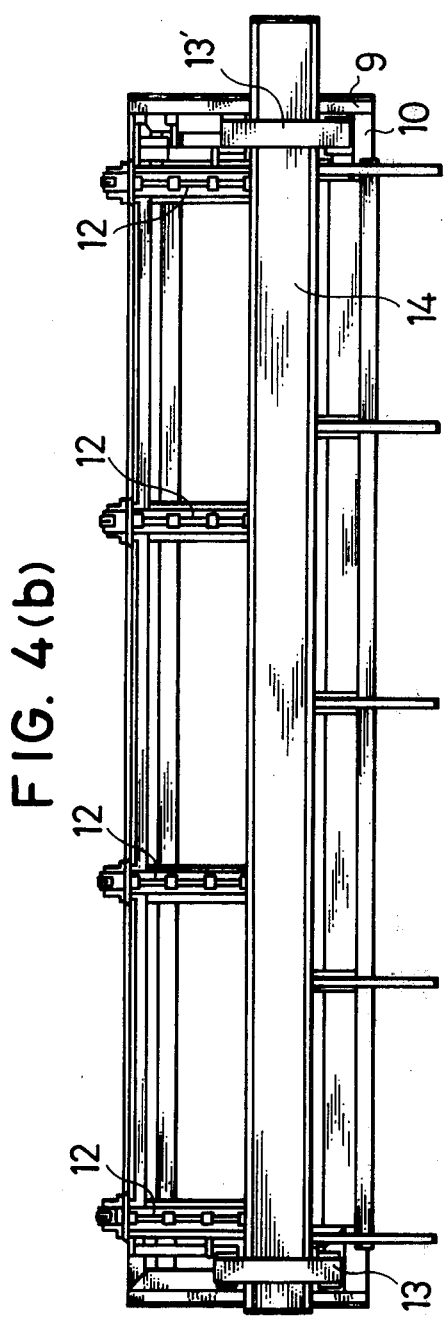

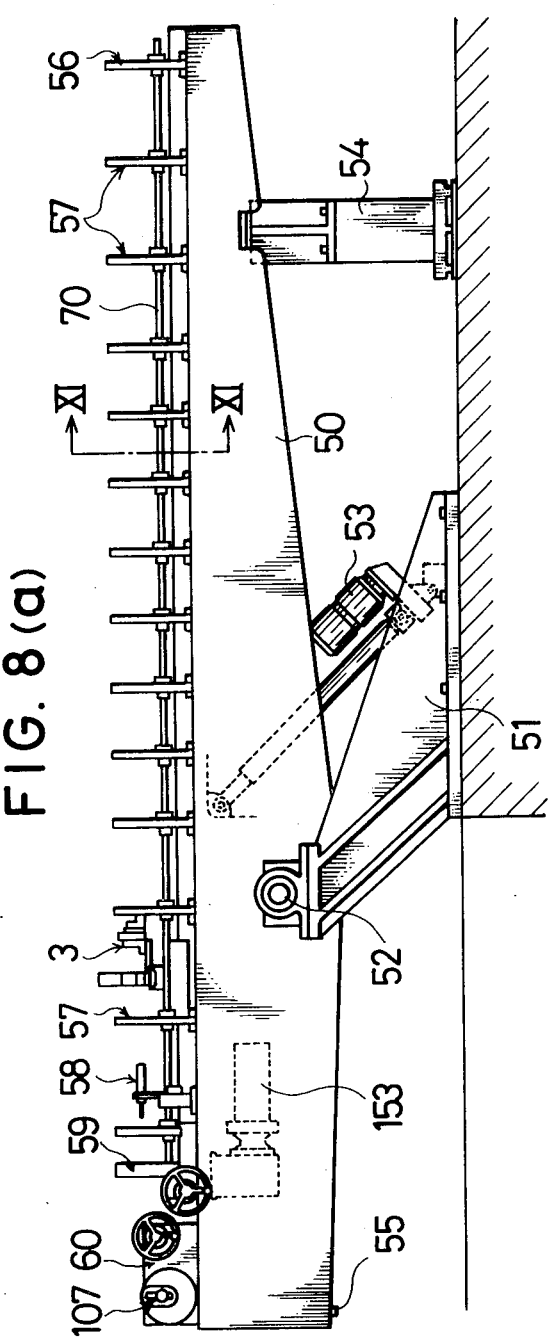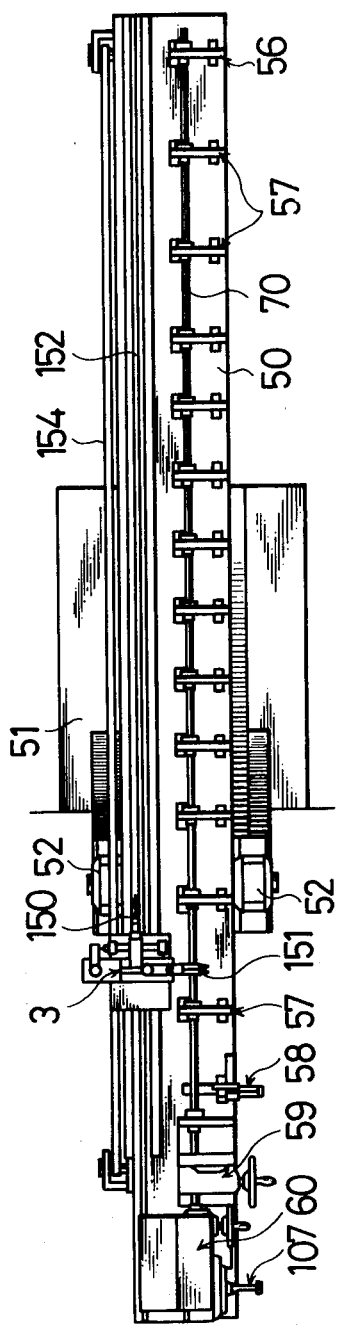

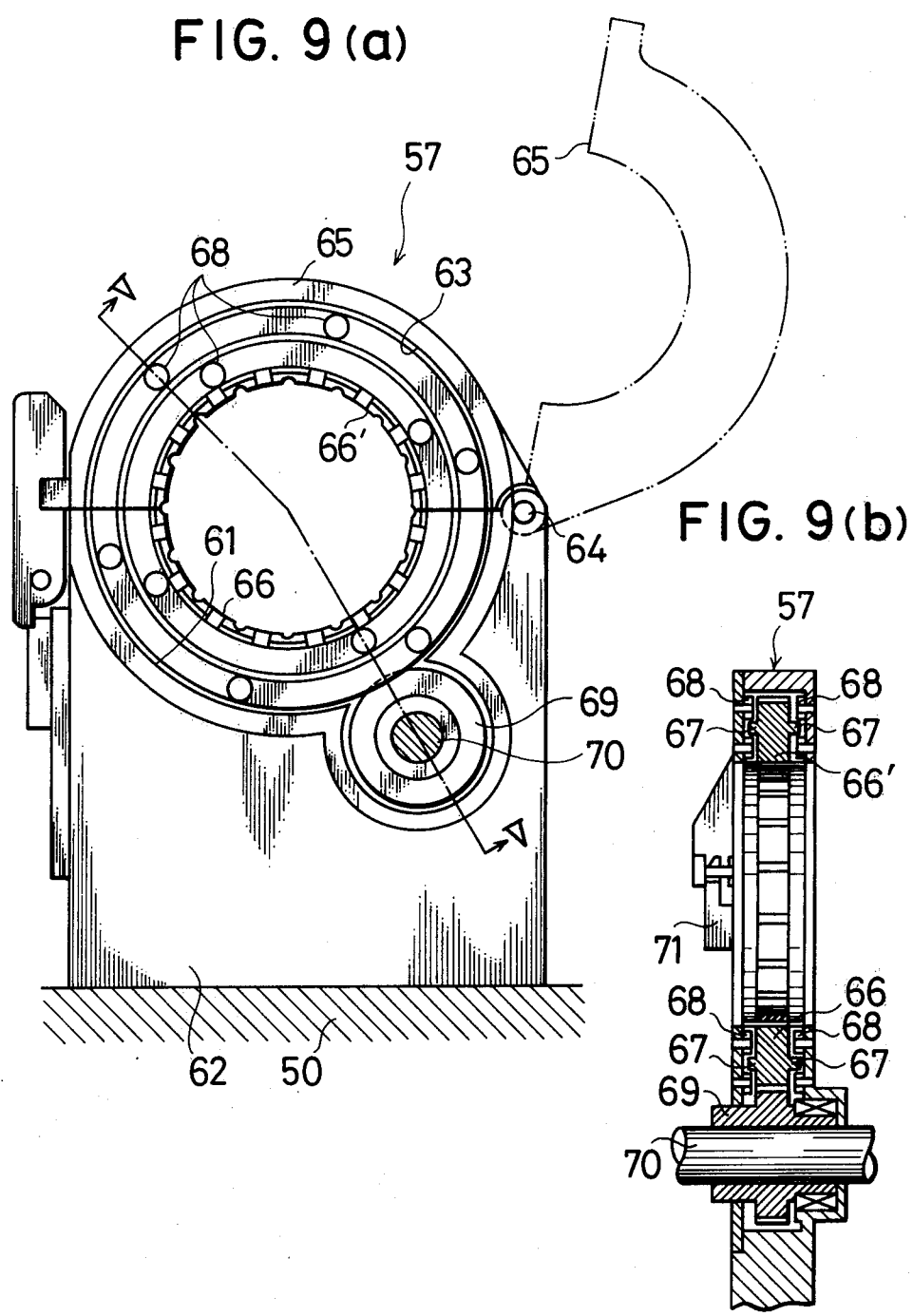

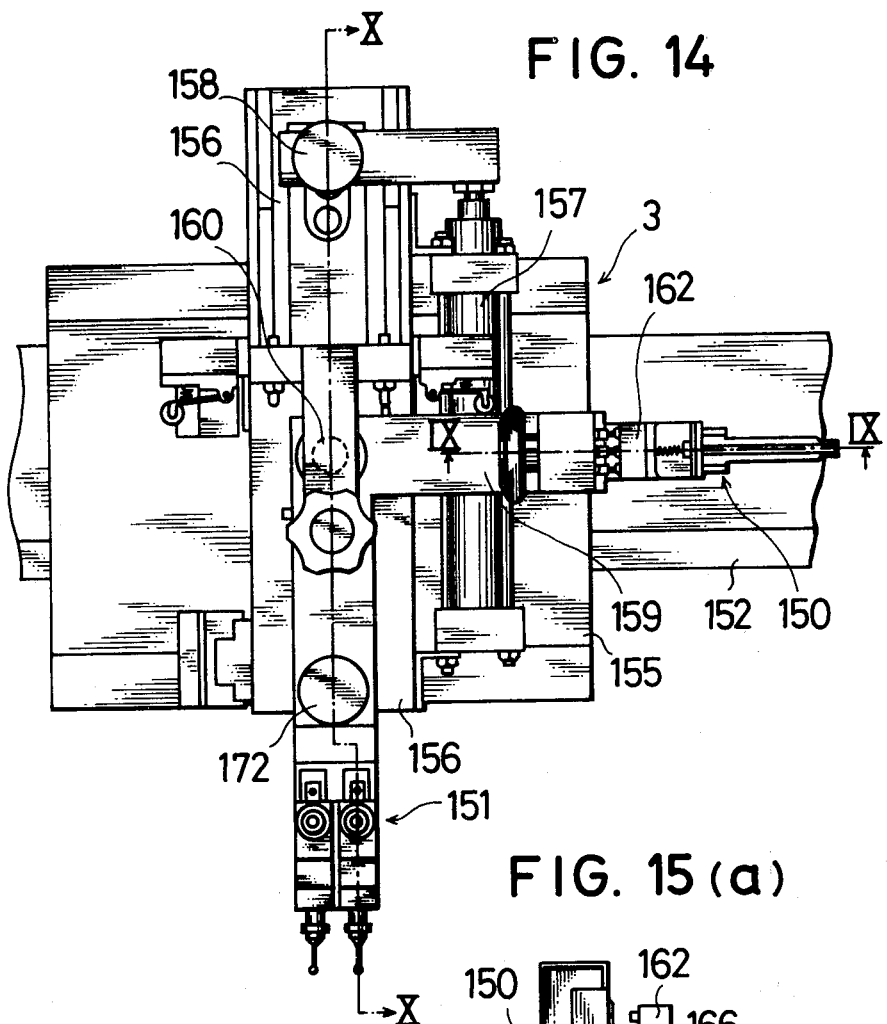
FIG. 14
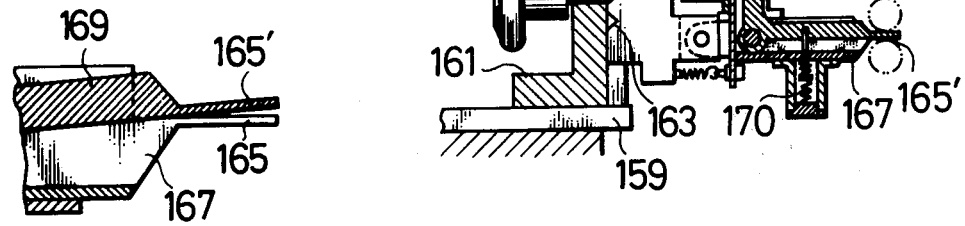
FIG. 15(a)
FIG. 15(b)

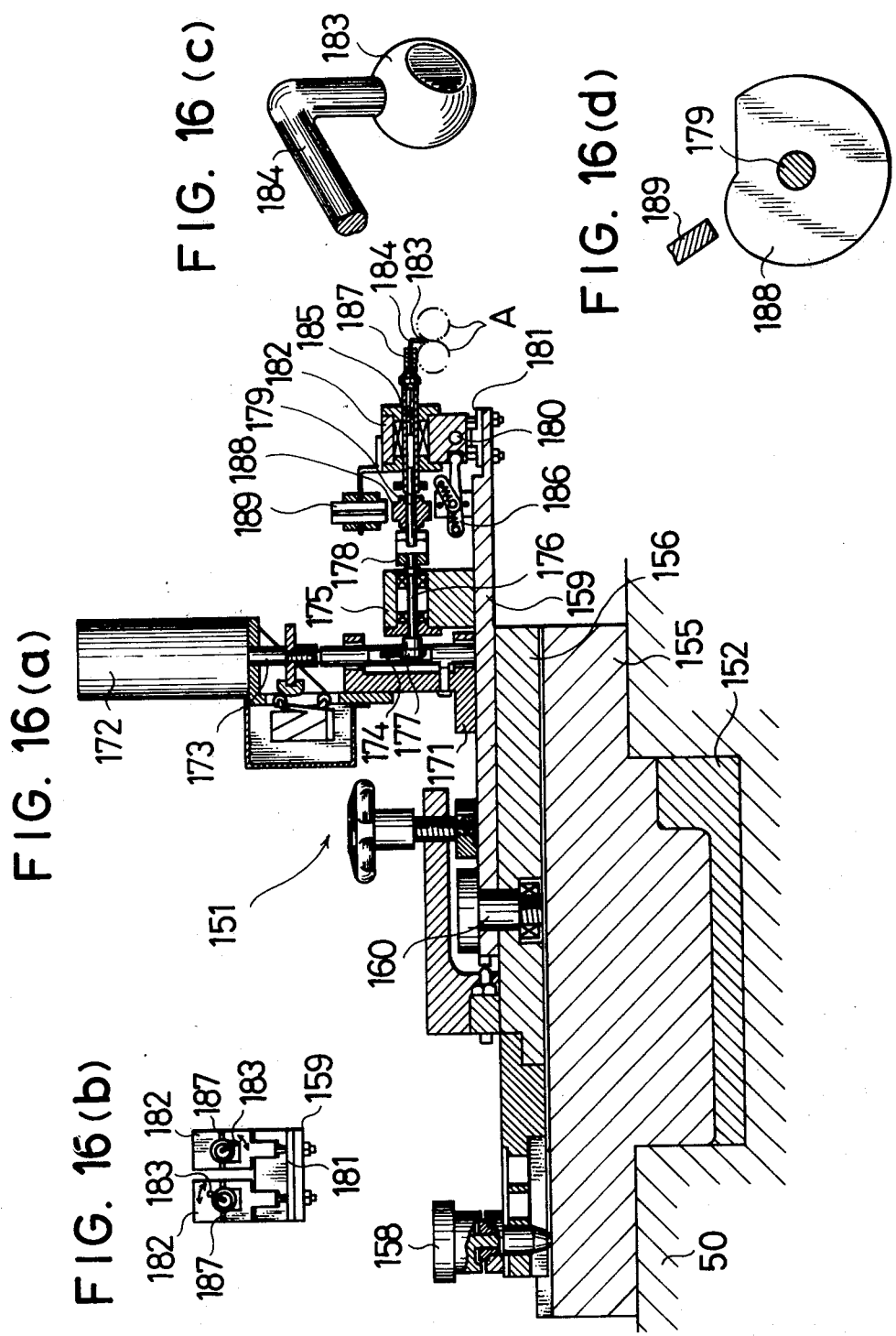

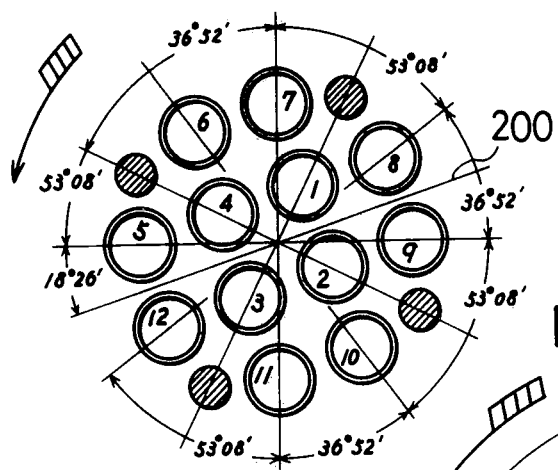
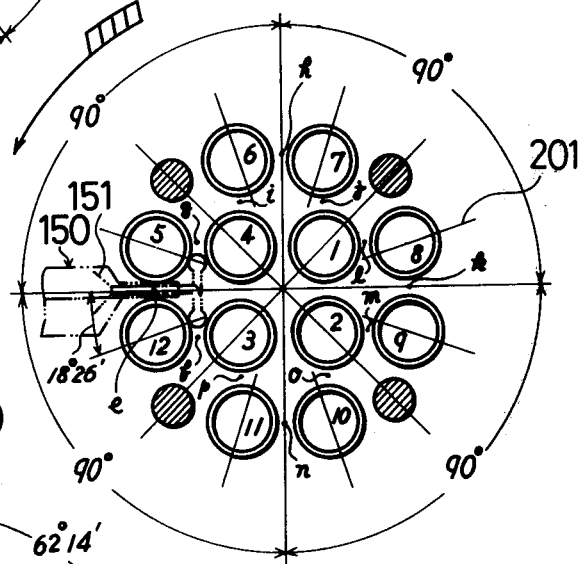
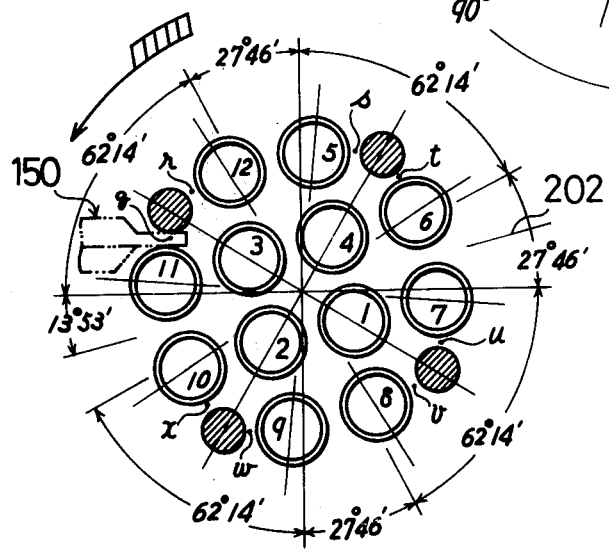

APPARATUS OF ASSEMBLING FUEL ROD BUNDLE

FIELD OF THE INVENTION

The present invention relates to an apparatus for assembling a fuel rod bundle or cluster for use in a nuclear reactor.

A fuel rod is constructed with a tubular sheath having nuclear fuels installed therein. In case of charging the fuel rods in the nuclear reactor the fuel rods are handled as a fuel rod assembly shown in FIG. 1(a). For example a number of fuel rods each having a diameter of 18 mm and a length of 5 m are held in an accurately defined geometrical position by means of a plurality of spacers B. The spacer is formed by short tubes welded to each other along their length so as to have a resilient comb-shaped construction. In FIG. 1(c) twenty eight fuel rods are combined in a three-layer construction. At both ends of an assembly of the thus combined fuel rods are secured a lower tie plate C and an upper tie plate D, respectively. These tie plates are secured to eight fuel rods A in the middle layer of the bundle by means of nuts G. To the upper tie plate is secured a hook E for carrying the fuel rod bundle.

In case of assembling the fuel rods it is required that each fuel rod A should be accurately positioned and fixed with a constant spacing. If this spacing is extremely small, there might be produced extraordinary heat so as to damage the fuel rods A.

In the prior art since high accuracy is required and the construction of the fuel rod assembly is complicated the fuel rods are assembled manually. Thus a lot of labor and long time are required and as a result influence of radiation upon the human body cannot be ignored. Therefore it is necessary to develop an automatic assembling apparatus from the view point of quality control and security. Moreover in case of checking the accuracy of the assembly an efficient checking cannot be effected owing to the large number of checking points and accurate data cannot be obtained.

SUMMARY OF THE INVENTION

The present invention has for its object to provide an apparatus which can assemble the nuclear fuel rods in a substantially automatic manner and which requires human power.

It is another object of the present invention to provide an assembling apparatus which comprises checking means which can check the assembling accuracy during and after the assembling operation.

It is still another object of the invention to provide an apparatus which comprises positioning means which can accurately and easily rotate the combined construction of fuel rods during the assembling and checking operations.

BRIEF DESCRIPTION OF THE DRAWINGS

FIG. 2 is a front view showing diagmatically an assembling apparatus according to the invention;

FIG. 3(a) is a partially cut away side view of a front portion of a fuel rod;

FIG. 3(b) is a plan view of a palette;

FIG. 3(c) is an enlarged cross sectional view cut along a line II—II in FIG. 3(b);

FIG. 4(a) is a side view showing a fuel rod supply apparatus;

FIG. 4(b) is a plan view of the fuel rod supply apparatus;

FIG. 8(a) is a side view illustrating a bundling apparatus;

FIG. 8(b) is a plan view of the bundling apparatus;

FIG. 9(a) is a cross sectional view showing a spacer fixing mechanism;

FIG. 9(b) is a longitudinally cross sectional view taken along a line V—V in FIG. 9(a);

FIG. 14 is a plan view showing a checking apparatus;

FIG. 15(a) is a longitudinal cross section illustrating a circular pitch measuring mechanism taken along a line IX—IX in FIG. 14;

FIG. 15(b) is an enlarged cross sectional view of a measuring feeler;

FIG. 16(a) is an enlarged cross section cut along a line X—X in FIG. 14 showing a layer space or pitch measuring mechanism;

FIG. 16(b) is a front view illustrating a feeler;

FIG. 16(c) is a perspective view showing a small ball;

FIG. 16(d) is an explanatory diagram of an eddy current type detector;

FIGs. 17(a) to 17(g) are cross sectional views cut along a line XI—XI in FIG. 8(a) showing the assembling and measuring operations.

FIG. 2 illustrates diagmatically an apparatus of assembling a fuel rod bundle according to the invention, which mainly comprises a rod supply apparatus 1, a bundling apparatus 2 and a checking apparatus 3. A reference numeral 4 denotes a center control device for supplying and receiving driving signals, measuring signals and supply power and recording measured data, and a reference numeral 5 designates a rod transport device.

Before assembling the fuel rods, each rod A is provided at its front end with a guide cap H of bullet type as shown in FIG. 3(a), which cap ensures the smooth passage of the rod through a short tube of a spacer B. As illustrated in FIG. 3(c) four rods A are arranged in a palette I and are supplied to the supply apparatus 1 by means of the rod carrying device 5. In the bottom surface of the palette I there are formed openings J for pushing upwards the fuel rod A. The fuel rods A transported to the supplying apparatus 1 are supplied one by one into the bundling apparatus 2 in which the spacers B and a lower tie plate C have been fixed or are held and are assembled into a fuel rod cluster. During and after the assembling the distances between adjacent fuel rods A are checked by means of the checking apparatus 3. Now the above mentioned apparatus will be explained.

SUPPLY APPARATUS

Figure 1A:
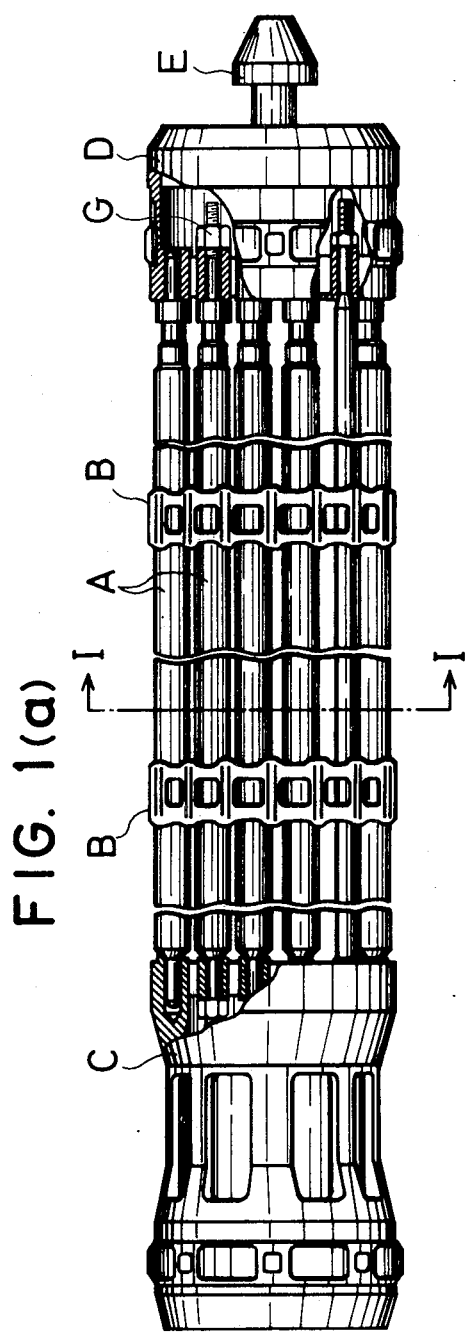
FIG. 1(a) is a partially cross sectional view showing an assembly of fuel rods.
Figure 1C:
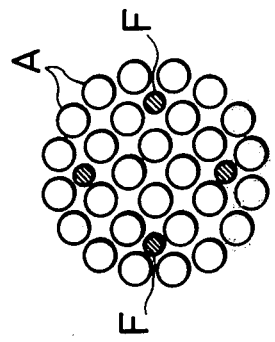
FIG. 1(c) is a cross sectional view cut along a line I—I in FIG. 1(a)
Figure 1B:
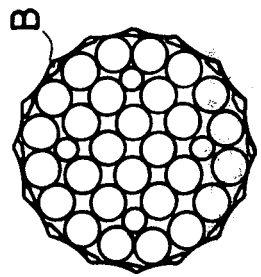
FIG. 1(b) is a plan view illustrating a spacer.

In FIG. 4 a reference numeral 9 designates a fixed base on which a movable base 10 is arranged movably in the direction at right angles to the longitudinal direction of the rod by means of a base carrying mechanism 11. On the movable base 10 there are provided four sets of chain conveyer mechanisms 12 which move intermittently in the direction at right angles to the longitudinal direction. On both ends of the movable base 10 there are arranged posts 13 and 13' to which is secured a rail 14. From the rail 14 is hung a rod pushing mechanism 15 movable forward and backward along the rail 14.

Figure 5:
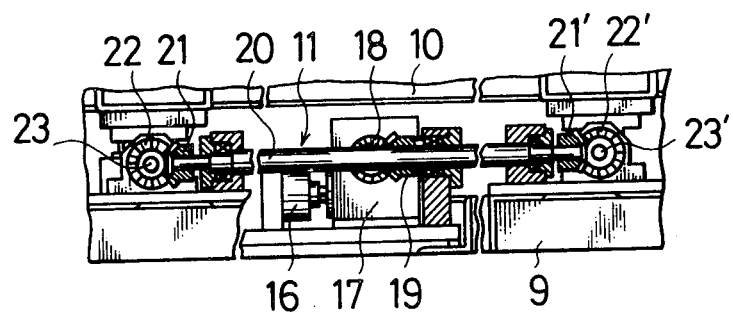
FIG. 5 is a partially cut away side view depicting a base carrying mechanism.
Figure 6:
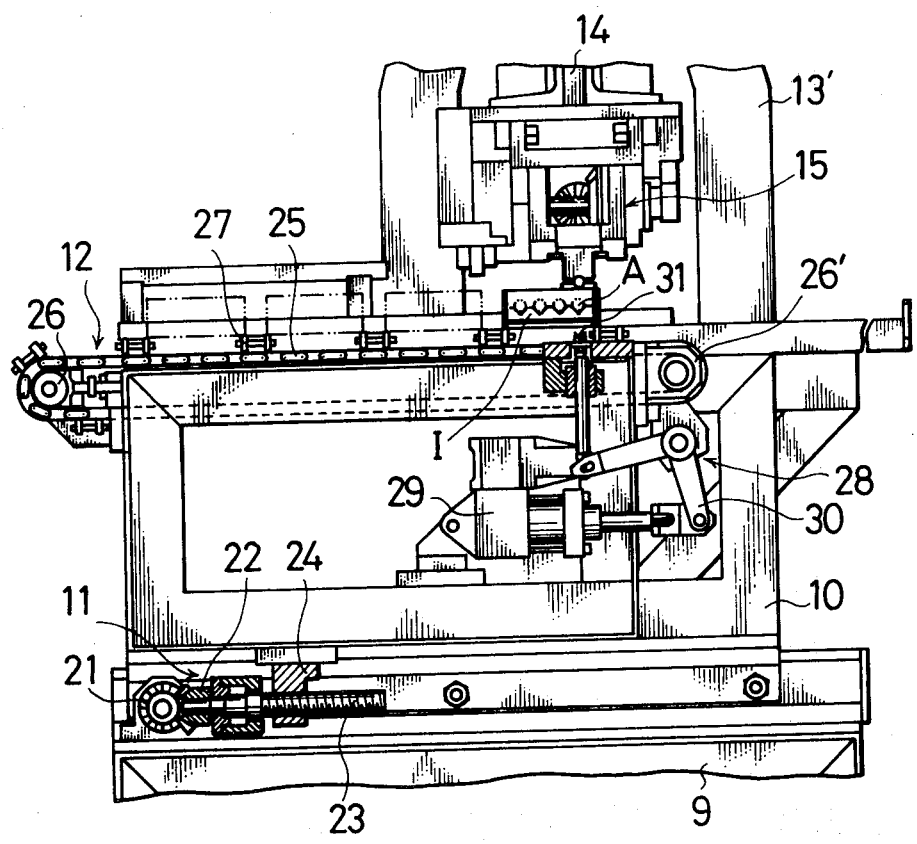
FIG. 6 is a cross sectional view taken along a line III—III in FIG. 4(a)

The movable base 10 on the fixed base 9 is moved by the base carrying mechanism 11 in the direction at right angles to the longitudinal direction of rod and is positioned at given positions. The fuel rods A are moved in accordance with layers of the spacers B. As shown In FIGS. 5 and 6 a rotation of a driving motor, for example a pulse motor 16 provided on an upper surface of the fixed base 9 is transmitted through a reduction device 17, a bevel gear 18 coupled to an output shaft of the reduction device 17 and a bevel gear 19 to a shaft 20. The rotation of the shaft 20 is transmitted through bevel gears 21 and 21' provided at both ends of the shaft 20, respectively and bevel gears 22 and 22' to screw shafts 23 and 23' respectively. The screw shafts are coupled with bearings 24, 24' (24' is not shown in the drawings) provided under the bottom of the movable base 10 so as to move the latter. The rotation of the pulse motor 16 is controlled by a signal supplied from the center control device 4 and the movable base 10 is accurately stopped at given positions.

The chain conveyer mechanism 12 is to move the palette I supplied from the supply device to a position below the rail 14. As illustrated in FIG. 6 a chain 25 which is wound between sprockets 26 and 26' is driven intermittently by a distance corresponding to a pitch of the rods A arranged in the palette I by means of a motor (not shown). On an outer surface of the chain 25 are provided rollers 27 which support the palette I in the longitudinal direction of the movable base 10 and are moved intermittently together with the chain 25.

Also as shown in FIG. 6 below the rail 14 is provided a mechanism 28 for pushing the rods upwards. This mechanism 28 pushes upwards the fuel rods A in the palette I one by one through the openings J formed in the bottom of the palette, which palette has been carried into position by the chain conveyer mechanism 12. A reciprocal movement of an air cylinder 29 is converted by means of a link mechanism 30 into up and down movement of pushing rollers 31 which push the rod A upwards to a given position and holds the rod at the raised position. Four pushing rollers 31 are arranged below the four openings J of the palette I and these rollers are simultaneously driven by the single common air cylinder 29.

Figure 7A:
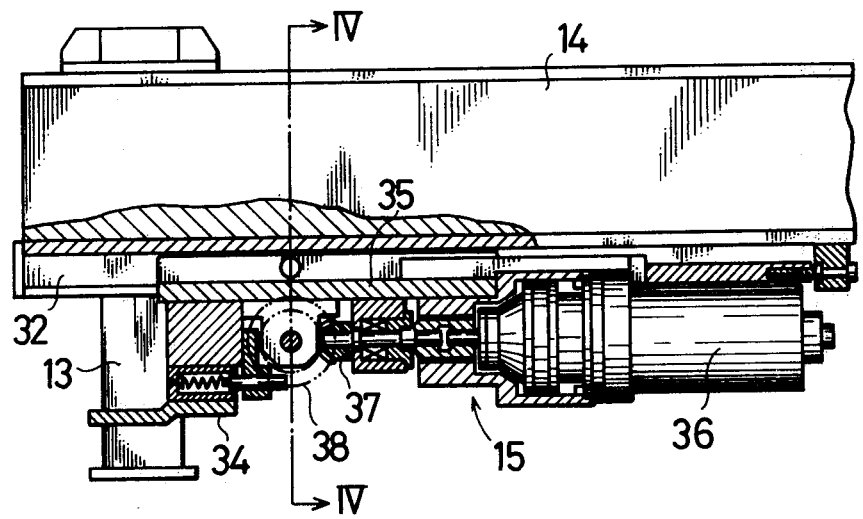
FIG. 7(a) is a longitudinal cross sectional view showing a pushing mechanism.
Figure 7B:
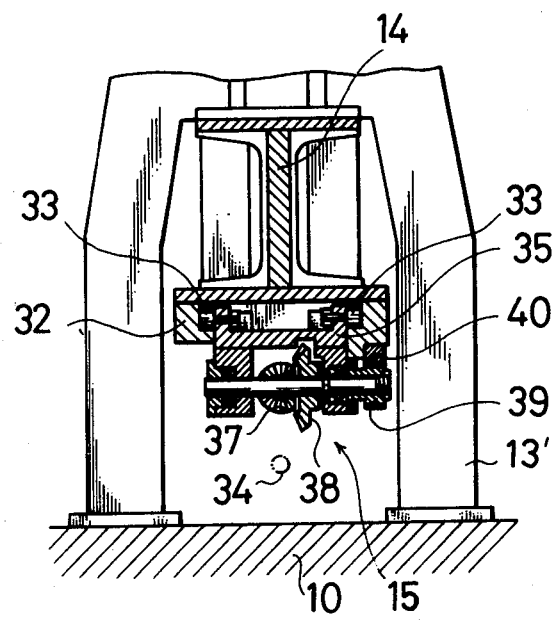
FIG. 7(b) is a cross sectional view cut along a line IV—IV in FIG. 7(a)

The fuel rod supplying mechanism 15 hung from the rail 14 is to push the rod A which has been held at a raised position at a given level from the palette I by means of the pushing rollers 31 of the rod pushing mechanism 28 to the bundling apparatus 2. As shown in FIG. 7 the rod supplying mechanism 15 comprises rails 32 provided on the lower surface of the rail 14, rollers 33, and a carrier 35 having a pushing block 34. The carrier 35 can move along the rails 32 by means of a driving motor 36 secured on the lower surface of the carrier, bevel gears 37, 38, a pinion 39 arranged coaxially with the bevel gear 38 and a rack 40 formed on the lower surface of the rail 32.

BUNDLING APPARATUS

The bundling apparatus 2 is arranged to follow the supply apparatus 1. In FIG. 8 a reference numeral 50 denotes a base having a length longer than the fuel rod A and almost all mechanisms are arranged on the base 50. The base 50 is rotatably supported by a bearing mechanism 52 having a seat 51 which is settled on a floor having an opening at a rear position. The base 50 can be tilted by means of a tilting mechanism including a screw cylinder 53 which is arranged under the base from a horizontal position to a vertical position. The horizontal position is determined by a portion of the base at the side opposite to the supply apparatus 1 and a horizontally positioning mechanism 54 provided on the floor. The vertical position is set by a portion of the base remote from the supply apparatus 1 and a vertically positioning mechanism 55 (shown only partly) provided on a corresponding wall of the opening of the floor. On one side of an upper surface of the base 50 there are arranged a guide ring fixing or holding mechanism 56, twelve spacer fixing mechanisms 57, a guide cap removing mechanism 58, a lower tie plate fixing mechanism 59 and a rotating mechanism 60. On the other side of the upper surface of the base there are provided a checking apparatus 3 having a circular pitch measuring mechanism 150 and layer space or pitch measuring mechanism 151. The checking apparatus 3 is slidably guided along a guide recess 152 formed in the upper surface of the base by means of a chain driving motor 153 and a chain 154.

The guide ring fixing mechanism 56 and spacer fixing mechanism 57 have substantially the same construction. As shown in FIG. 9 the spacer fixing mechanism 57 comprises a receptor 62 provided on the base 50 and having a semicircular recess 61 at the upper side and a cover 65 having a semicircular recess 63 at the lower side and is pivotably connected to the receptor 62 by a shaft 64. In the semicircular recesses 61 and 63 there are fixed semicircular gears 66 and 66', respectively which have teeth on both their outer surfaces and inner surfaces having the shape corresponding to the outer contour of the spacer B, the inner surfaces having linings of hard ruber material. These semicircular gears 66 and 66' can be slidably connected by the engagement of semicircular extrusions 67 and a plurality of rollers 68 provided in the recesses 61 and 63. Thus when the cover 65 is closed, the semicircular gears 66 and 66' serve as a single ring-shaped gear which can rotate freely in the semicircular recesses 61 and 63. In the receptor 62 there is arranged a spur gear 69 which engages with the semi-circular gears 66 and 66' and the gear 69 is driven by a main rotating shaft 70 which extends coaxially through gears 69 of the guide ring fixing mechanism 56 and each of the spacer fixing mechanisms 57 and a lower tie plate fixing mechanism 59 and is rotated by the rotating mechanism 60 as will be explained later. On the rear side of the receptor 62 there is formed a stop means 71 for preventing the spacer B from being removed from the fixing mechanism during the insertion of the fuel rods A.

Figure 10A:
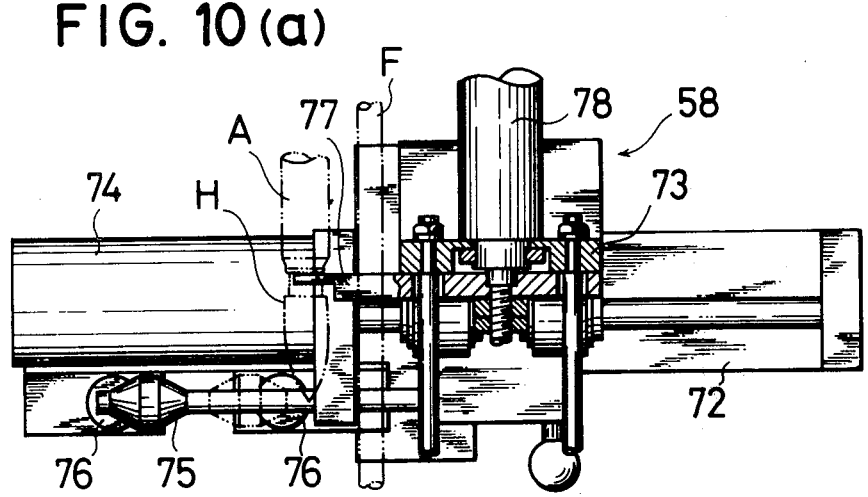
FIG. 10(a) is a plan view illustrating a guide cap removing mechanism.
Figure 10B:
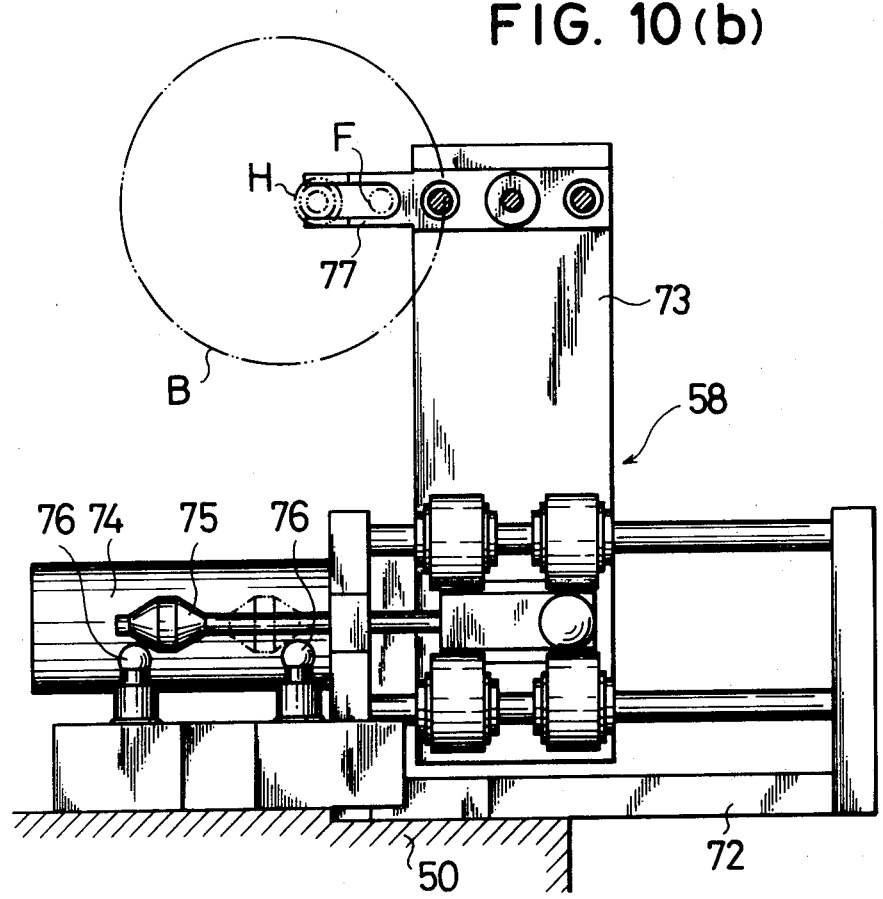
FIG. 10(b) is a front view of the guide cap removing mechanism.
Figure 11A:
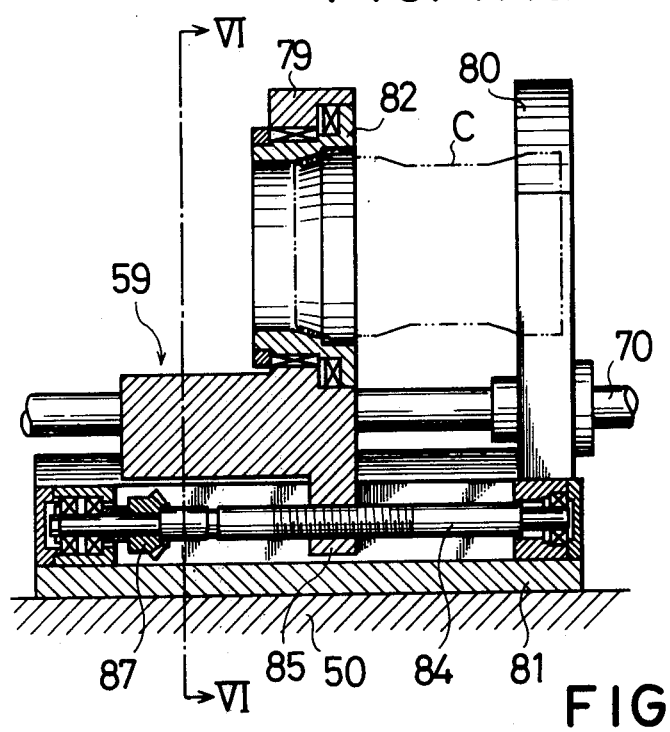
FIG. 11(a) is a longitudinal cross section depicting a lower tie plate fixing mechanism.
Figure 11B:
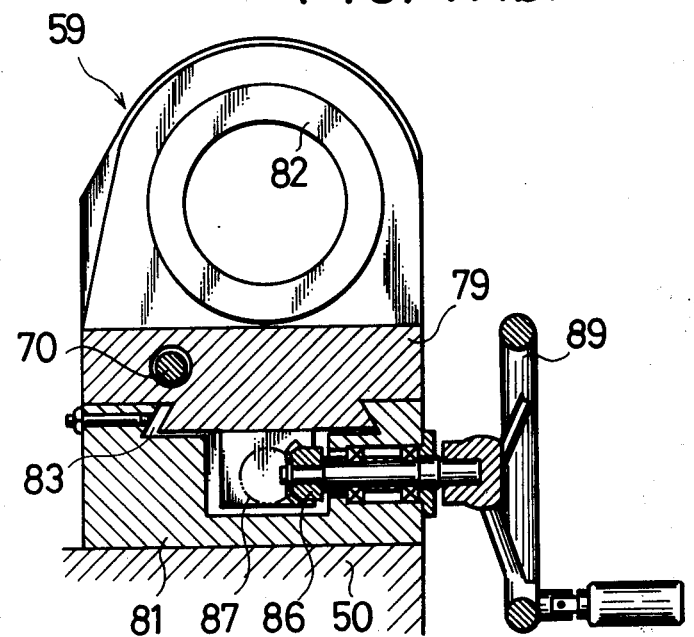
FIG. 11(b) is a cross sectional view cut along a line VI—VI in FIG. 11(a)

The guide cap removing mechanism 58 is to remove the guide cap H on the top of the fuel rod A which has been inserted in the spacers B. As illustrated in FIG. 10 this mechanism 58 comprises a stationary base 72 provided on the base 50 and a slide plate 73 movably secured to the base 72 in a direction perpendicular to the longitudinal direction of the base 50. The slide plate 73 can be slidably moved by means of an air cylinder 74 secured to the stationary plate 72 and can be positioned at any one of three given positions in relation to the layers of the fuel rod assembly by means of a top-shaped member 75, limit switches 76 secured to the plate 72 and including springs. A guide cap removing plate 77 having a U-shaped recess is secured to the slide plate 73 at the same level with the center axis of the guide ring fixing mechanism 56 and spacer fixing mechanisms 57 at right angles with respect to the longitudinal direction of the base 50. The plate 77 can be moved in the longitudinal direction of the base 50 by an air cylinder 78.

The lower tie plate fixing mechanism 59 comprises a sliding member 79 and a fixing member 80 having the same construction as that of the guide ring fixing mechanism 56 and the spacer fixing mechanisms 57. These members 79 and 80 are installed on a base plate 81. The lower tie plate fixing mechanism 59 is to move downward the sliding member 79 so as to make free the rod assembly and is to finely adjust the axial position of the assembly after the rods have been assembled and the assembly has been moved into the vertical position and hung by a crane with the hook E of the upper tie plate D and the spacer fixing mechanism 57, guide ring holding mechanism 56 and the holding member 80 have been released. The holding member 80 comprises a rotatable inner ring 82 which can accomodate the bottom of the lower tie plate C. The sliding member 80 can be slidably arranged in a dovetail recess 83 formed in the base plate 81 in the longitudinal direction of the base 50 and can be moved by an engagement of a screw shaft 84 arranged in the longitudinal direction of the base 50 and a bearing 85 provided on the lower side of the sliding member 79, the screw shaft 84 can be rotated by a handle 89 through a pair of bevel gears 86 and 87.

Figure 12A:
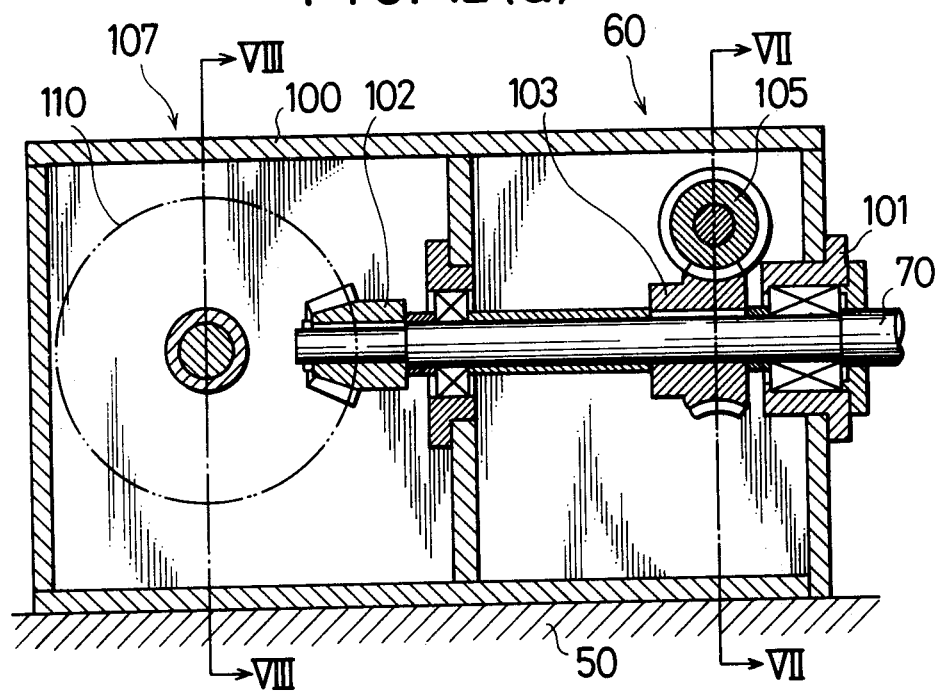
FIG. 12(a) is a longitudinal cross section showing a rotating mechanism.
Figure 12B:
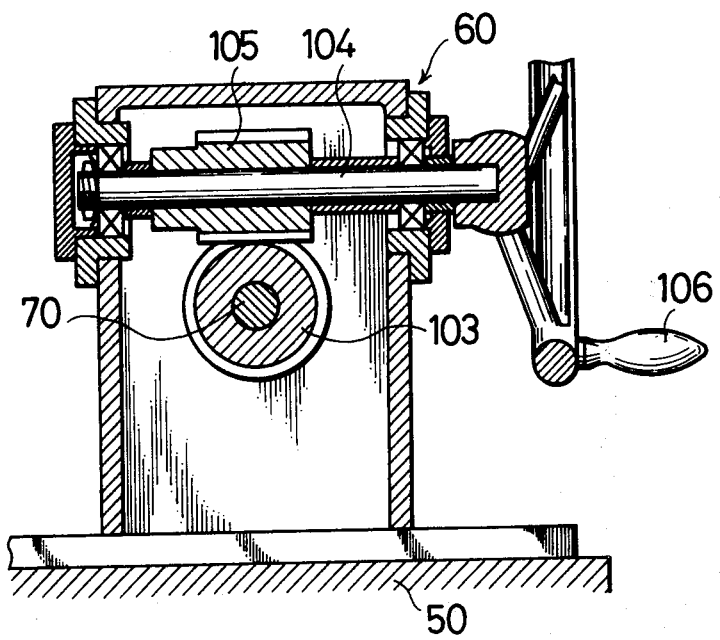
FIG. 12(b) is a cross section taken along a line VII—VII in FIG. 12(a)

The rotating shaft 70 which passes through the guide ring holding mechanism 56, spacer holding mechanisms 57 and lower tie plate holding mechanism 59 is rotated by a rotating mechanism 60 shown in FIG. 12. An end portion of the shaft 70 is rotatably supported by a bearing 101 provided in a casing 100. A bevel gear 102 is fixed at the end of the shaft 70 and a worm wheel 103 is provided on the shaft 70. The worm wheel 103 is engaging with a worm 105 fixed on a handle shaft 104 which is journaled in the casing 100 perpendicular to the main rotating shaft 70. The handle shaft 104 can be rotated by means of a handle 106 provided at the side of the casing 100 so as to rotate manually the main shaft 70.

Figure 13A:
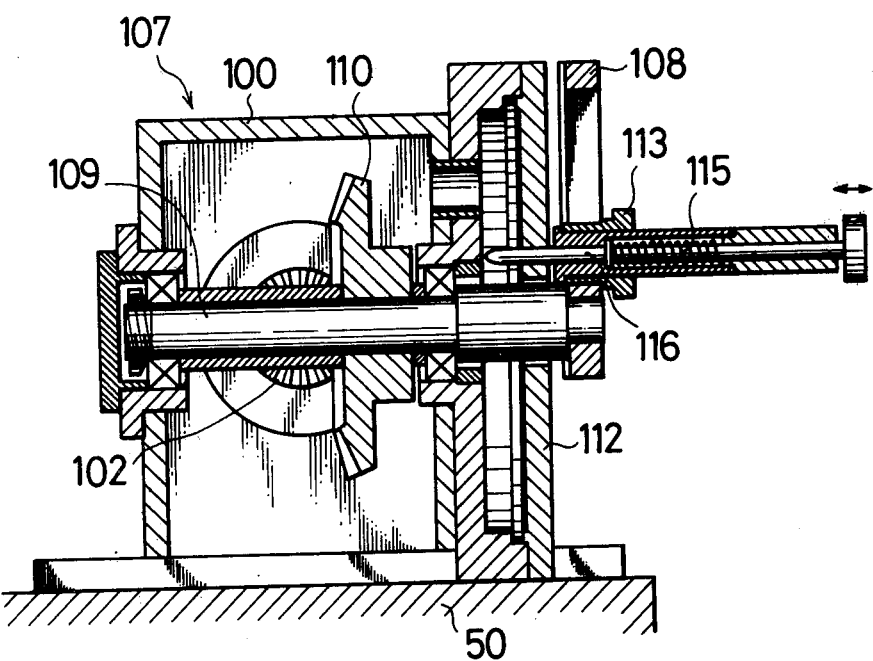
FIG. 13(a) is a cross sectional view taken along a line VIII—VIII in FIG. 12(a) showing a positioning mechanism.
Figure 13B:
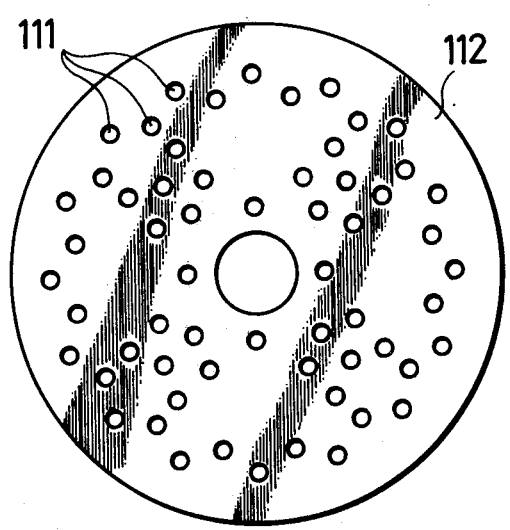
FIG. 13(b) is a front view illustrating a positioning disc.
Figure 13C:
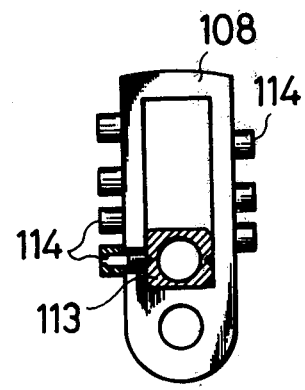
FIG. 13(c) is a front view of a positioning base.

For the insertion of the fuel rods A and checking the main shaft 70 must be positioned precisely at various angular positions. The rotating mechanism 60 comprises a dividing mechanism 107 shown in FIG. 13. The dividing mechanism 107 comprises a dividing plate 108 which is secured to an end of a shaft 109 rotatably supported in the casing 100 in a direction perpendicular to the main shaft 70. To the shaft 109 is secured a bevel gear 110 which engages with the bevel gear 102 secured at the end of the main shaft 70. A dividing plate 112 having a number of dividing holes 111 formed precisely for determining the dividing positions is provided coaxially with the shaft 109. In a center recess of the dividing plate 108 there is slidably arranged a sliding element 113 which can be fixed at any one of seven positions by means of seven fixing elements 114. In the sliding element 113 there is arranged a slidable dividing pin 116 having a spring 115 in the direction of the shaft 109. The pin 116 can be resiliently inserted into a dividing hole 111. When it is required to change a rotation angle of the main shaft 70, the dividing pin 116 is removed from the dividing disc 112 and then the sliding element 113 is moved on a circle on which a dividing hole 111 corresponding to an angle to be divided and is fixed at that position by the fixing element 114. Then the handle 106 of the rotating mechanism 60 is rotated so as to rotate the main shaft 70. When the shaft 70 is rotated to the given angular position, the dividing pin 116 is inserted into the given dividing hole 111 by the resilient force of the spring 115 and the rotation of the shaft 70 is stopped.

CHECKING APPARATUS

As explained before the checking apparatus is arranged at one side of the upper surface of the base 50 and can be moved in parallel with the rod assembly formed by the bundling apparatus. The checking apparatus is mainly comprised of a circular pitch measuring mechanism 150 and a layer space or pitch measuring mechanism 151. A base plate 155 is slidably arranged in a guide groove 152 formed in the upper surface of the base 50 along the longitudinal direction of the base 50 and is moved by a chain driving motor 153 and a chain 154. On the base plate 155 is provided a sliding plate 156 which can be moved in a direction perpendicular to the longitudinal direction of the base 50 by an air cylinder 157 so as to move the measuring mechanisms 150 and 151 in a forward direction during the measurement and in a backward direction for preventing the measuring mechanisms from striking against the spacer holding mechanisms 57. A reference numeral 158 denotes a manual positioning mechanism for changing the positions of the measuring mechanisms 150, 151 into several positions in accordance with the layers of the fuel rods A. On the sliding plate 156 an L-shaped plate 159 is pivotably arranged about a supporting point 160. The circular pitch measuring mechanism 150 and the layer space measuring mechanism 151 are provided at each end of the L-shaped plate 159, respectively. Any one of these mechanisms 150 and 151 can be selected by rotating the plate 159 and the selected mechanism is directed at right angles with respect to the longitudinal direction of the base 50.

The circular pitch measuring mechanism 150 is to measure the circular pitch of the assembled rods A. As shown in FIG. 15 a base plate 161 is secured on the rotating plate 159 and a sliding plate 162 is arranged on the side wal of the plate 162 slidably in up and down directions. In a surface of the sliding plate 162 which contacts with the baseplate 161 there are formed three V-shaped recesses 163 and a screw 164 which secured in the baseplate 161 can be engaged with any one of the recesses 163. To the sliding plate 162 is pivoted a measuring head 167 which comprises at its one end a measuring element 165 formed by a strip mad of super hard metal and at the other end opposite to the sliding plate 162 a coil 166 of a differential transformer. To the measuring head 167 is pivotably provided an L-shaped lever 169 which comprises at its one end a measuring element 165' similar to the measuring element 165 and at the other end a iron core 168 inserted in the coil 166. Upward or downward displacement of the element 165' with respect to the element 165 is converted into a displacement of the core 168 and thus a D.C. output signal can be derived from the coil 166 in proportion to the distance of displacement of the core 168. The measuring head 167 is connected to a spring 170 which pushes slightly the L-shaped lever 169 upwards and thus the measuring elements 165 and 165' are usually held in a separated position as illustrated in FIG. 15(b). Therefore the circular pitch measuring mechanism 150 can measure the pitch between adjacent fuel rods A in a vertical direction.

Figure 16E:
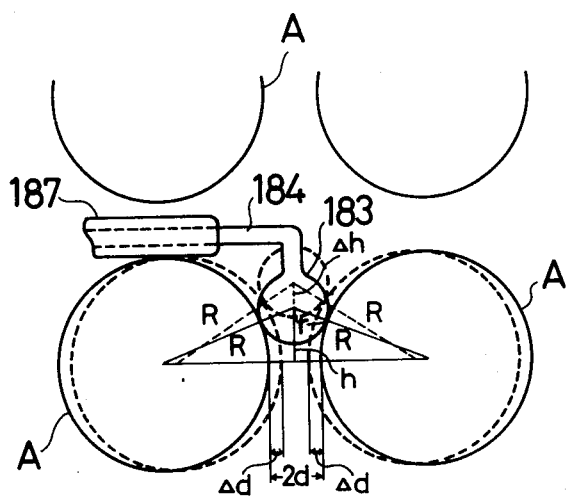
FIGs. 16(e) and 16(f) are diagrams for explaining measurement principle.
Figure 16F:
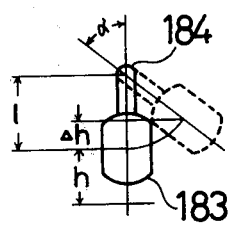

The layer space measuring mechanism 151 is to measure the distances or pitches between adjacent layers of the assembled fuel rods A. As shown in FIG. 16 this mechanism comprises a baseplate 171 fixed on the rotating plate 159 and an air cylinder 172 having a piston rod 173 movable up and down. The piston rod 173 has a rack 174 formed at its top end and the rack 174 engages with a pinion 177 provided at an end of a shaft 176 which is supported by a bearing bed 175. The other end of the shaft 176 is coupled to a universal joint 178 which has a resiliency in a rotating direction and this joint 178 is further connected to a measuring shaft 179 which is arranged coaxially with the shaft 176. The measuring shaft 179 is movably supported in an axial direction by means of a swinging plate 182 which is swingably supported by a supporting base 181 at a supporting point 180. At the free end of the measuring shaft 179 is provided an L-shaped feeler 184 made of super hard metal and having formed at its top end a small ball 183. A diameter of this ball 183 of the feeler 184 is longer than a layer space or pitch to be expected or anticipated. Both sides of the ball 183 are cut off as illustrated in FIG. 16(c). The feeler 184 is connected to a spring 185 so as to be able to move in an axial direction relative to the measuring shaft 179, but the rotation of the feeler with respect to the shaft 179 is inhibited. However the feeler 184 is rotated together with the measuring shaft 179. A pushing mechanism 186 is provided for changing resiliently an inclined angle of the swinging plate 182 with respect to the axial direction and for urging a measurement reference guide 187 provided at the base portion of the feeler 184 against the outer fuel rod of the two adjacent fuel rods forming the layer space or pitch to be measured. At the middle of the measuring shaft 179 there is secured an eccentric cam 188 shown in FIG. 16(d) and a rotation angle of the measuring shaft 179 can be measured by measuring a distance between the cam 188 and a eddy current type detector 189 fixed to the swinging plate 182. Thus when the small ball 183 provided at the top of the feeler 184 is directed, for example downwards and is pushed into the space between adjacent fuel rods A, the free end of the feeler 184 is rotated by a given angle.

Strictly speaking the layer space measuring mechanism 151 does not directly measure the space between the adjacent fuel rods A. As shown by solid lines in FIG. 16(e) when a radius of the fuel rod A is denoted by R, a distance between the adjacent rods A by 2 d, a radius of the small ball 183 by r and a distance between the center of the ball 183 and a middle point on a line connecting the center points of the adjacent rods A is designated by h, the following equation can be obtained.

$$(R+r)^2 = (R+d)^2 + h^2 \qquad (1)$$

If the layer space is reduced by $2\Delta$ as shown by dotted line and becomes $2d - 2\Delta d$ and thus the feeler 184 having a length l from a rotation center to the center of the ball 183 is twisted over an angle $\alpha$ and the height h is increased into $h + \Delta h$, then the following equations can be derived.

$$(R+r)^2 = (R+d-\Delta d)^2 + (h+\Delta h)^2 \qquad (2)$$

$$(l-\Delta h) = l \cos \alpha \qquad (3)$$

From the equations (1), (2) and (3)

$$\Delta d^2 - 2(R+d)\Delta d + l(1-\cos \alpha)\{l(1-\cos \alpha) + 2h\} = 0 \qquad (4)$$

can be obtained. In this equation since R and l has been known and d and h have been determined previously a half of the deviation of the layer space can be obtained by detecting the twist angle $\alpha$ and the equation (4) is solved with respect to $\Delta d$. In practice the solution can be effected by an analogous operation and a calibration can be carried out using a standard master gauge.

In order to measure the layer pitch or space the feeler 184 must be passed through the space between the adjacent fuel rods A and thus the measuring shaft 179 must be once rotated by operating the air cylinder 172 so as to situate the ball 183 in parallel with the axial direction of the fuel rod A and then the small ball 183 is inserted between the adjacent rods A and after that the small ball 183 is directed upwards or downwards. In the preferred embodiment two sets of the layer space measuring mechanisms 151 are arranged side by side with using the air cylinder 172 commonly and use is made of two feelers 184 so as to measure the upper and lower layer spaces simultaneously so as to reduce the measuring time.

In the embodiment shown in the drawings the circular pitch measuring mechanism 150 and the layer space measuring mechanism 151 are provided at each end of the L-shaped rotating plate 159 and can be used selectively. However two sets of the sliding plates 156 may be arranged in parallel with each other at right angles to the longitudinal direction of the base 50 and both of the measurements of circular pitch and layer space of pitch may be effected simultaneously.

In the various apparatuses and mechanisms explained above there are arranged limit switches, access switches, lead switches, etc. which are not explained above and these elements operate in relation to the center control apparatus 4 so as to control start and stop of various operations in accordance with a given sequence. Moreover in the above embodiment the rotation of the main shaft 70 and sliding movement of the lower tie plate holding mechanism 59 are carried out by means of the manual handles, but these operations may be performed by any other suitable driving mechanisms. Particularly the main shaft 70 may be rotated automatically together with the dividing mechanism 107.

The above apparatuses are operated manually or by means of the center control apparatus 4 in relation to each other. Next the whole operation will be explained.

Before assembling the fuel rod bundle the base 50 of the bundling apparatus 2 is fixed in the horizontal position and twelve spacers B and guide ring having the similar configuration to the spacer are installed in the twelve spacer fixing mechanisms 57 and guide ring fixing mechanism 56 with opening the lid members 65. Since the guide ring only serves to guide the insertion of fuel rods A the guide ring will be removed after the insertion of fuel rods A. The lower tie plate C is set in the lower tie plate fixing mechanism 59 and four tie rods F are passed through the guide ring, the spacers B and the lower tie plate C.

Figure 17A:
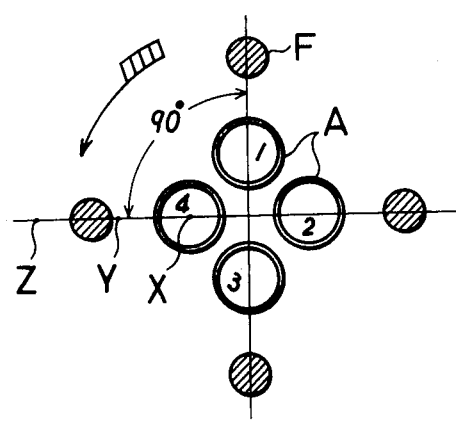

Upon assembling the fuel rods 1 to 4 of the inner most layer of the bundle are first inserted as illustrated in FIG. 17(a). In this case the spacers B, etc. are rotated by the rotating mechanism 60 using the dividing mechanism 70 and a position X of the short tubes of the spacers B through which the fuel rod 1 has to be inserted is situated at the same level of the center line of the spacers B, etc. Then the moving base 10 is moved in such a position that the pushing position of the fuel rod pushing mechanism 15 corresponds to the above position X. Next the first fuel rod 1 is pushed in the upward direction by means of the pushing mechanism 28 and then is transported into the binding apparatus 2 by the pushing mechanism 15. During this pushing operation the fuel rod 1 is successively passed through the guide ring and the given small tubes of the spacers B. The guide cap H provided at the top of the fuel rod 1 serves as the guide during the passage of the fuel rod 1 through the successive short tubes of the spacers B. After the completion of the insertion of the fuel rod 1 and the top of the rod A has reached the guide cap removing mechanism 58 provided on the base 50, the forward pushing of the fuel rod 1 is stopped. Then the guide cap removing plate 77 of the guide cap removing mechanism 58 is inserted into the rear part of the guide cap H as shown in FIG. 10(a) and then is moved in the longitudinal direction of the fuel rod 1 toward the lower tie plate holding mechanism 59 so as to take off the guide cap H. Then the fuel rod 1 from which the guide cap H has been removed is further moved until it reaches the lower tie plate C. Before the insertion of the next fuel rod 2 the spacers B, etc. are rotated over 90° as shown in FIG. 17(a). In this manner the four fuel rods 1 to 4 belonging to the innermost layer are successively inserted.

Figure 17B:
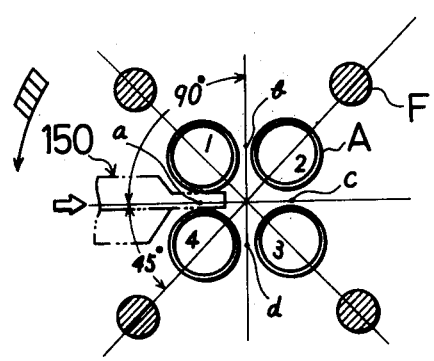

After the four fuel rods 1 to 4 have been inserted circular pitches a to d between successive adjacent fuel rods are measured as shown in FIG. 17(b). The spacers B, etc. are accurately rotated by 45° by means of the rotating mechanism 60 having the dividing mechanism 107 and then the measuring elements of the circular pitch measuring mechanism 150 is inserted into the space a as illustrated in the drawing. Then the checking apparatus 3 is moved along the fuel rods by the chain 154 so as to measure the deviation of the circular pitch in a continuous manner. It should be noted that each time the measuring mechanism 150 reaches the spacer holding mechanism 57 the measuring mechanism 150 must be detoured by moving the sliding plate 156 with use of the air cylinder 157. After the pitch a has been measured the spacers B, etc. are rotated by 90° in a direction shown by an arrow and the pitches b to d are successively measured.

Next eight fuel rods 5 to 12 belonging to a next layer are to be inserted. For this purpose the moving base 10 is moved so as to be able to insert the fuel rod 5 at a position Y shown in FIG. 17(a). That is as depicted in FIG. 17(c) the spacers, etc. are rotated by 18° 26' from the position at which the insertion of the four rods 1 to 4 of the inner most layer has been completed and then the fuel rod 5 is inserted. Then the fuel rods 6 to 12 are successively inserted in a similar manner as explained above with rotating the semi-assembly of the spacers, fuel rods, etc. by successive angles shown in FIG. 17(c). After the eight fuel rods 5 to 12 belonging to the second layer have been inserted a circular pitch e between the adjacent fuel rods 5 and 12 is first measured and then the layer space measuring mechanism 151 is made operable by drawing the rotating plate 159 of the checking apparatus 3 so as to measure the layer spaces f and g, simultaneously along the inserted fuel rods 3, 4, 5 and 12. The similar operations are repeated so as to measure successively the pitches h, i, j, k, l, m, and n, o, p as illustrated in FIG. 17(d). Further as shown in FIG. 17(e) circular pitches q, r, s, t, u, v, w, and x between the tie rods F and the inserted fuel rods with using the circular pitch measuring mechanism 150. In this case the measuring head 167 is moved up and down by the given distances with utilizing the V-shaped grooves 163 formed in the sliding plate 162 of the circular pitch measuring mechanism 150 so as to insert horizontally the measuring elements 165 and 165' and then the pitches q to x are measured.

Figure 17F:
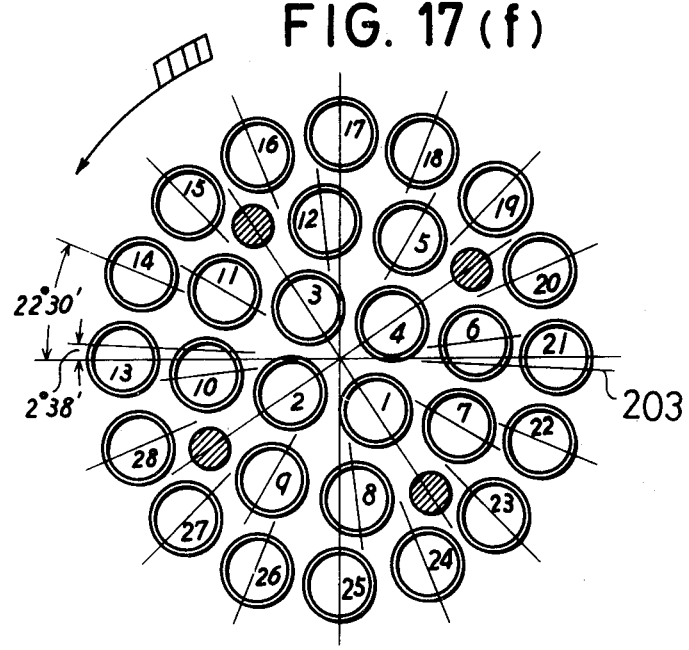

Furthermore sixteen fuel rods 13 to 28 belonging to a third layer are successively inserted as shown in FIG. 17(f). Then sixteen circular pitches and eight layer spaces y to v' are measured. In this manner the insertion of the fuel rods 1 to 28 and the measurement of circular pitches and layer spaces or pitches are completed.

After the measurement results are examined and is ascertained to be satisfactory the guide ring is removed from the guide ring holding mechanism 56 and the upper tie plate D is connected to the end of the assembly and the four spacer tie rods F are inserted into the upper tie plate D.

Figure 17G:
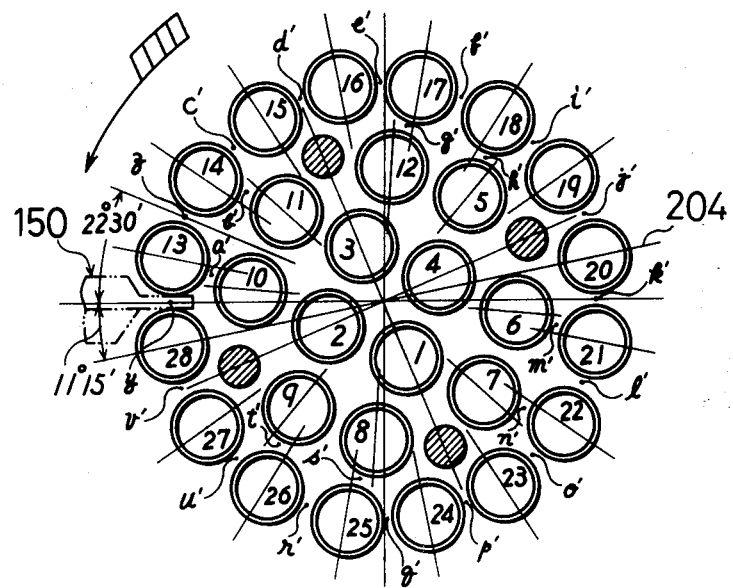

Then the base 50 shown in FIG. 8 and having the assembly arranged thereon is moved in the vertical position and the pitches y to v' illustrated in FIG. 17(g) are again measured in the vertical position. Then the hook E of the upper tie plate D is engaged with a carrying apparatus such as a crane (not shown) and then the covers 65 of the spacer holding mechanisms 57, lower tie plate holding mechanism 59 and the guide ring holding mechanism 56 in which the upper tie plate D is held are opened and the sliding member 79 of the lower tie plate holding mechanism 59 is moved in the longitudinal direction, that is to say in the downward direction in the vertical position of the base 50 and is removed from the lower tie plate C so as to make free the assembly which will be then transported to a next step such as a washing step. In this manner one cycle of the assembly is completed.

In the embodiment mentioned above the measurements of pitches are effected each time the fuel rods belonging to the same layer have been inserted. The measurements of pitches may be performed each time the fuel rod has been inserted.

As explained above in detail the apparatus for assembling the nuclear fuel bundle according to the invention can make the assembling operations automatic which has been effected manually heretofore and a lot of labor and time can be saved. Moreover the safety against radiation problem can be improved. Further the automatic measurement can increase the measuring accuracy and the reliability of the fuel rod assembly can be increased by the continuous measurement along the fuel rods contrary to sampling measurement of the known technique.

The apparatus according to the invention can be utilized not only in assembling the fuel bundle, but also in deconstructing the fuel bundle and in measuring the pitches of the fuel assembly used in the nuclear reactor.

We claim:

1. An apparatus for assembling a fuel rod bundle which has a number of fuel rods arranged in parallel with each other and fixed at given positions by means of a plurality of spacers and a lower tie plate comprising:
   a fuel rod supply apparatus including
   a base movable in a direction at right angles to a longitudinal direction of the fuel rods to be assembled and being stopped at any one of several selected given positions,
   a mechanism arranged on the movable base and being movable in the direction at right angles to the longitudinal direction of the fuel rods for carrying and positioning the successive fuel rods at a given position, and
   a mechanism arranged on said movable base for moving upwardly the fuel rod positioned at said given position and feeding the raised fuel rod in its longitudinal direction; and
   a bundling apparatus arranged on a line extending from said supply apparatus and including an elongated base,
   a mechanism arranged on the elongated base for holding the lower tie plate,
   a plurality of mechanisms arranged on the elongated base along its longitudinal direction for holding said plurality of spacers,
   a main shaft extending through said mechanisms, and
   a mechanism for rotating said main shaft so as to rotate in an interlocking manner the lower tie plate and spacers held by said holding mechanisms, whereby after said movable base is moved at the given position and said lower tie plate and spacers are rotated to given angular positions the raised fuel rod positioned at the given position is inserted into the spacers and lower tie plate at given positions.

2. An apparatus according to claim 1, said apparatus further comprising a checking apparatus including a circular pitch measuring mechanism and a layer space or pitch measuring mechanism which are movable in the longitudinal direction of the fuel rods assembled on the base of the bundling apparatus.

3. An apparatus according to claim 1, wherein said spacer holding mechanism of the bundling apparatus comprises a receptor, a cover and a pair of rotatable semi-circular gears provided in said receptor and cover, said semicircular gears being formed by dividing a ring shaped gear.

4. An apparatus according to claim 1, wherein said lower tie plate holding mechanism of the bundling apparatus comprises a sliding member movable in the longitudinal direction of the base.

5. An apparatus according to claim 1, wherein the bundling apparatus further comprises a guide ring holding mechanism having a similar construction to the spacer holding mechanism and arranged on the base at a position near the supply apparatus.

6. An apparatus according to claim 1, wherein said rotating mechanism comprises a dividing mechanism having a dividing disc and a dividing base.

7. An apparatus according to claim 1, wherein said bundling apparatus comprises a device for removing a guide cap provided on the lower end of the fuel rods between the spacer holding mechanism and the lower tie plate holding mechanism.

8. An apparatus according to claim 1, wherein said bundling apparatus further comprises a mechanism for holding the base at horizontal and vertical positions.

9. An apparatus according to claim 2, wherein the circular pitch measuring mechanism of the measuring apparatus comprises a measuring head which can change a measuring level position in a stepwise manner.

10. An apparatus according to claim 2, wherein the layer space measuring mechanism comprises an L-shaped feeler having a spherically shaped end.

11. An apparatus according to claim 2, wherein said layer space measuring mechanism comprises a detector having a measuring shaft, an eccentric cam secured to the shaft and an eddy current type detector for detecting the rotation of the cam.

12. An apparatus according to claim 10, wherein said layer space measuring mechanism further comprises a mechanism for twisting the feeler.

13. An apparatus according to claim 2, wherein two sets of the layer space measuring mechanisms are provided side by side.

14. An apparatus according to claim 2, wherein said circular pitch measuring mechanism and layer space measuring mechanism are provided at each end of an L-shaped swingable plate, respectively.

15. An apparatus according to claim 2, wherein said circular pitch measuring mechanism and layer space measuring mechanism are provided side by side in the direction at right angles to the longitudinal direction of the fuel rod.

* * * * *